M. B. SCHENCK & J. A. JOHNSON.
CASTER.
APPLICATION FILED OCT. 4, 1909.
968,424.
Patented Aug. 23, 1910.
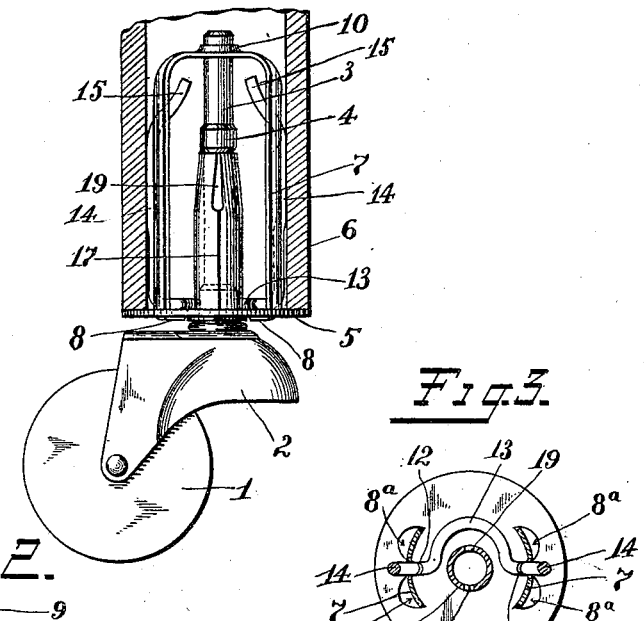
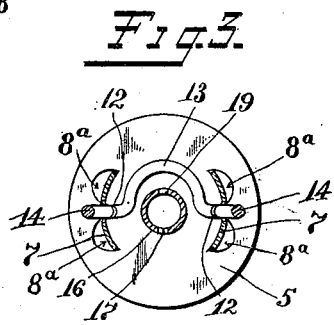
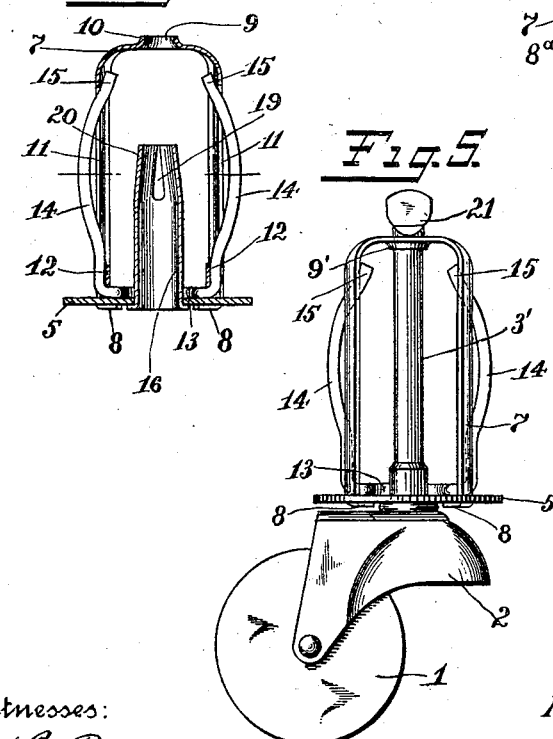
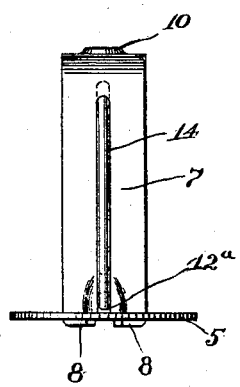
Witnesses:
M. B. Schenck, Inventors
J. A. Johnson

UNITED STATES PATENT OFFICE.

MARTIN B. SCHENCK AND JOHN ADOLPH JOHNSON, OF MERIDEN, CONNECTICUT, ASSIGNORS TO THE M. B. SCHENCK COMPANY, OF MERIDEN, CONNECTICUT, A CORPORATION OF CONNECTICUT.

CASTER.

968,424.

Specification of Letters Patent. Patented Aug. 23, 1910.

Application filed October 4, 1909. Serial No. 520,875.

*To all whom it may concern:*

Be it known that we, MARTIN B. SCHENCK and JOHN ADOLPH JOHNSON, citizens of the United States, residing at Meriden, county of New Haven, State of Connecticut, have invented certain new and useful Improvements in Casters, of which the following is a full, clear, and exact description.

Our invention relates to improvements in casters and has for its object to produce a new and improved caster having means for retaining the same inside a tubular leg.

It also has for its object to produce a caster in which the pintle carrying the yoke and wheel can be easily inserted and removed from the caster socket or retainer.

The following is a description of an embodiment of our invention, reference being had to the accompanying drawings, in which, Figure 1 shows the caster consisting of the socket, pintle, yoke and wheel inserted in a tubular leg; Fig. 2 shows a vertical section of the socket; Fig. 3 shows a horizontal section of the socket on the section line of Fig. 2; Fig. 4 shows a side elevation of the socket; and, Fig. 5 shows a modification of the complete caster withdrawn from the tubular leg.

Referring more particularly to the drawings, 1 represents a caster wheel.

2 represents a caster yoke, this part being of the ordinary construction.

3 represents a caster pintle, which, in the form shown in Fig. 1, is provided with an enlargement 4.

5 represents a supporting disk or plate of the socket on which the tubular leg 6 rests.

Surrounding the pintle is a device 7 centering its upper end. It is preferably rigidly secured to the supporting disk. We preferably make this device or centering means 7 in the form of a sheet metal skeleton frame secured to the plate or disk by providing it with tangs 8 which are passed through openings 8ᵃ in the plate 5 and bent over as shown in the drawings.

The frame which constitutes a plug is preferably curved around a vertical axis so as to provide curved bearing surfaces for the tubular leg. It centers the upper end of the pintle and also the plate secured to its lower end which plate in turn centers the lower end of the pintle. The centering frame is provided with an opening 9 at its upper end, through which the pintle 3 passes. The metal around this opening is forced outward as at 10 so as to have funnel-shaped sides, the large mouth of the funnel facing the plate 5 and serving to guide the pintle 3 into the opening when the pintle is being inserted. The frame 7 is provided on each side with vertical slots 11. These slots do not extend to the bottom of the frame and the lower portion 12 of the frame 7 directly beneath the slots is bent inward so as to leave a slight vertical recess for a retaining spring hereafter described.

The extreme lower end of the frame 7 above the space between the tangs 8 is cut away as shown at 12ᵃ so as to permit the passage of the retaining spring beneath the portion 12 and immediately above the plate 5. This retaining spring consists of a lower portion 13 and the side arms 14 connected thereto. The portion 13 is bent so as to partially encircle the hole in the disk 5. The portions 12 of the frame extend over the horizontal portion 13 of the spring and thus prevent the upward movement of the spring and holds it close to the disk 5. The upper ends 15 of the side arms 14 pass through the slots 11, and bear against the inside surface of the frame 7 and are therefore held from expansive movement when the caster is removed from the leg. As the caster is forced into the leg, the arms 14 are forced inward as shown in Fig. 1 and make frictional contact with the inside surface of the leg, thereby holding the socket in place. The frame 7 centers the socket within the leg and prevents undue expansive movement of the spring arms 14 after the caster has been removed from the leg. The wire spring is prevented from moving upward by the portion 12 of said frame.

In order to permit the pintle to be inserted and withdrawn from the socket or retainer, we provide a spring sleeve 16 which is open or slit at one side along the line 17 and has at its upper end two diametrically opposite cut away portions 19. The upper portions of the sleeve are tapered at 20. This sleeve is made of spring metal. As the pintle is forced into the sleeve, the projection 4 causes the upper ends of the sleeve to separate until the projection 4 has passed above the sleeve, whereupon they come together and hold the pintle in place until it is forcibly drawn outward. When it is drawn outward, the upper ends of the sleeve separate and permit it to be removed. The tapered sides of the opening 10 assist in guiding the upper end of the pintle through the opening 9 when it is being inserted. The hole 9 centers the upper end of the pintle so as to relieve the sleeve 16 of all strain when the caster is in use, the sleeve 16 being connected to the disk 5 independently of the centering frame.

In the modified form shown in Fig. 5, the parts are the same as in the other figures with the exception that there is no projection 4 of the pintle 3', and the split sleeve 16 is omitted, the pintle being held permanently in place, preferably by being headed over or flattened at its upper end, as at 21. The sides of the opening 9' in this form may also be tapered in the opposite direction, as shown in Fig. 5, since, when the caster is permanently assembled for insertion in the leg, the inward enlargement of the opening may more easily be dispensed with. We prefer to have the retaining spring frame made of spring wire and in the form of an upright U, secured and restrained in the manner shown in the drawings, but it is obviously subject to various modifications which will produce the result of retaining the socket in the tubular leg in substantially the same manner. The upright U-shaped wire spring frame having its lower portion passing between the lower portion of the sheet metal centering frame and the disk, and its upper ends within the limits of and restrained by the sheet metal centering frame itself, is, however, the preferred form.

What we claim is:

1. In a caster, the combination of a caster wheel, yoke and pintle, a disk surrounding the pintle and upon which the tubular leg rests, an upright U-shaped spring frame having its legs on opposite sides of the pintle, centering means engaging and centering the upper end of the pintle and having an internal bearing surface engaging the upper ends of the U-shaped spring and restraining them from undue expansion.

2. In a caster, the combination of a caster wheel, yoke and pintle, a disk surrounding the pintle and upon which the tubular leg rests, a skeleton centering frame surrounding the pintle, a spring frame partially within the skeleton frame, but having its sides extending beyond the limits of said skeleton frame, the movable ends of said spring frame being free to move relatively to one another, but restrained within the limits of the skeleton frame.

3. In a caster, the combination of a caster wheel, yoke and pintle, a supporting disk surrounding the pintle, a centering frame secured to said supporting disk, an upright U-shaped frame having its arms on opposite sides of said pintle, the upper ends of said arms engaging said centering frame and being restrained from undue expansion by said engagement.

4. In a caster, the combination of a caster wheel, yoke and pintle, a disk surrounding said pintle upon which the tubular leg rests, a centering frame secured to said disk, said centering frame having lateral openings, an upright U-shaped spring frame having its arms on opposite sides of said pintle and its upper ends passing through said openings and engaging the inner sides of said centering frame so as to be held against undue expansion.

5. In a caster, the combination of a caster wheel, yoke and pintle, a disk surrounding the pintle upon which the tubular leg rests, a centering inverted U-shaped frame, said centering frame having vertical slots and openings in its sides, said openings being below said slots, an upright U-shaped spring frame passing through said openings so as to have the lower parts of its arms outside of said centering frame and having the upper ends of its arms passing through said slots so as to engage the inner sides of said centering frame and be thereby prevented from undue expansion.

6. In a caster, the combination of a caster wheel, yoke and pintle, said pintle having an enlargement thereon, a disk for supporting the tubular leg and surrounding said pintle, means connected to said disk for centering said disk on and holding the same to said tubular leg, and a split sleeve surrounding said pintle beneath the projection upon said pintle, the upper end of said sleeve being open and below the upper end of said centering means and contracted so as to engage said projection, said centering means having an opening at its upper end into which the upper end of the pintle enters, thereby making direct engagement with said frame.

7. In a caster, the combination of a caster wheel, yoke and pintle, said pintle having an enlargement thereon, a disk for supporting the tubular leg and surrounding said pintle, centering means connected to said disk for centering said disk on and holding the same to said tubular leg, and a split open ended sleeve surrounding said pintle beneath the projection upon said pintle, the upper end of said sleeve being contracted so as to engage said projection and cut away at a point removed from the slit therein, said pintle extending beyond said sleeve and making direct lateral engagement with the upper portion of said centering means.

8. The combination of a caster wheel, yoke and pintle, a supporting disk surrounding said pintle, a centering frame secured to said supporting disk and having an opening at its upper end into which the upper end of the pintle enters, thereby making direct engagement with said frame, and means secured to said disk independently of said frame and engaging said pintle below the upper end of said frame, so as to hold the pintle in place.

9. The combination of a caster wheel, yoke, and pintle, a supporting disk surrounding said pintle, a centering frame secured to said supporting disk and having an opening at its upper end into which the upper end of the pintle enters, thereby making direct engagement with said frame, a split tube secured to said disk independently of said centering frame and engaging said pintle between said frame and said disk so as to hold the pintle in place.

10. The combination of a caster wheel, yoke and pintle, a supporting disk surrounding said pintle, a centering plug secured to said supporting disk having openings at its sides, an upright U-shaped spring having its ends within the limits of said plug and restrained from undue expansion, and means for preventing the upward movement of said spring.

11. In a caster, the combination of a caster wheel, yoke and pintle, a supporting disk surrounding said pintle, an inverted U-shaped frame rigidly secured to said disk, said frame having slotted sides, an upright U-shaped spring frame having its upper ends passing through said slots and engaging the inner sides of said frame, and means for preventing the spring from moving upwardly relatively to said disk.

MARTIN B. SCHENCK.
J. ADOLPH JOHNSON.

Witnesses:
MABEL E. SEARLES,
W. A. SCHENCK.